United States Patent [19]
DiMarco

[11] Patent Number: 6,032,868
[45] Date of Patent: Mar. 7, 2000

[54] COMBINED HOT WATER AND SPACE HEATER

[76] Inventor: Giovanni DiMarco, 408 Ellerslie Ave., Willowdale, Ontario, Canada, M2R 1C2

[21] Appl. No.: 08/823,770

[22] Filed: Mar. 24, 1997

[30] Foreign Application Priority Data

Mar. 19, 1996 [CA] Canada .................................. 2.172.416

[51] Int. Cl.[7] ...................................................... F24D 3/00
[52] U.S. Cl. ............................................. 237/8 R; 237/19
[58] Field of Search ................................ 237/8 R, 19, 16; 165/48.1; 126/101, 361; 236/25 R

[56] References Cited

U.S. PATENT DOCUMENTS

| | | | |
|---|---|---|---|
| 4,155,506 | 5/1979 | Brosenius .................................. | 237/81 |
| 4,454,911 | 6/1984 | Arbabian ............................. | 165/104.19 |
| 4,469,935 | 9/1984 | Candela ..................... | 219/314 |
| 4,598,557 | 7/1986 | Robinson et al. ...................... | 62/238.6 |
| 4,848,655 | 7/1989 | Woodin et al. .......................... | 237/8 R |
| 4,922,861 | 5/1990 | Tsutsui et al. .............................. | 237/19 |
| 4,925,093 | 5/1990 | Moore, Jr. et al. ........................ | 237/19 |
| 5,074,464 | 12/1991 | Moore, Jr. et al. ....................... | 237/19 |
| 5,076,494 | 12/1991 | Ripka ........................................ | 237/19 |
| 5,544,645 | 8/1996 | Armijo et al. ............................ | 126/101 |

*Primary Examiner*—Henry Bennett
*Assistant Examiner*—Derek S. Boles
*Attorney, Agent, or Firm*—Barrigar & Moss

[57] ABSTRACT

An apparatus and method are disclosed for supplying domestic potable hot water and also heating an air space using a single combination unit having a common water tank and heat source for heating water therein. The water tank has an outlet for the supply of heated potable water and an inlet for the replenishment of same with cold water. A portion of the hot water is recirculated through a heat exchanger mounted in an air handler or housing. The air handler has a blower for passing the room air through the heat exchanger to heat the air space. The temperature drop of the water circulating through the heat exchanger is limited to 6° F. by using a low pressure drop heat exchanger and a relatively high flow rate circulating pump, so the supply of potable hot water is always sufficient. Air heating is suspended if the heated air drops below 115° F.

4 Claims, 5 Drawing Sheets

COMBINED HOT WATER AND SPACE HEATER

BACKGROUND OF THE INVENTION

The present invention relates to domestic hot water heaters, and in particular, to combination units that use part of the hot water heated by these heaters for space heating purposes.

Most buildings that require a domestic or potable hot water supply as well as space heating use separate devices for each purpose. For example, a typical house has a domestic hot water heater with its own water tank and burner or electric element to heat the water in the tank. If heating is required, a separate furnace or space heater is employed. This room air heater again has its own burner or electric heating element. This is inefficient and wastes energy and is unnecessarily expensive due to the duplication of equipment.

Attempts have been made in the past to overcome some of these inefficiencies by trying to use a single burner or heat source for both the domestic hot water and space heating requirements. So called combination units have been produced which are basically conventional domestic water heaters. When there is no demand for the heated potable water, rather than have the water tank sit idle wasting energy through heat loss, the hot water is circulated through a heat exchanger mounted in an air handler or blower and thus used to heat the air space.

Examples of the above-mentioned combination units are disclosed in Canadian patents Nos. 2,002,488 issued Nov. 11, 1994 and 2,033,415 issued May 3, 1994, and also in U.S. Pat. Nos. 4,925,093 issued May 15, 1990 and 5,074,464 issued Dec. 24, 1991. A difficulty with these prior art combination units, however, is that the heat exchangers reduce the temperature of the water in the water tanks so much that there is either an inadequate supply of hot water when it is required, or the air that is heated by the heat exchanger is at so low a temperature that it is uncomfortable. As a result, neither the hot water heating nor the room air heating is satisfactory and the units are not generally accepted in the marketplace.

The present invention keeps the temperature drop of the water passing through the heat exchanger low enough not to interfere with the supply of domestic hot water, yet provides an ample flow rate through the heat exchanger to provide ample hot air at a comfortable temperature adequate to meet the room air heating requirements.

SUMMARY OF THE INVENTION

According to one aspect of the invention, there is provided a combination hot water and space heater comprising a tank having an inlet for receiving cold water and an outlet for delivering hot water therefrom. An energy source is provided for heating water in the tank to a predetermined maximum temperature. A housing having an air inlet and an air outlet is provided as well as a fan for passing air through the housing from the inlet to the outlet at a predetermined flow rate. A heat exchanger is located in the housing. The heat exchanger has an inlet communicating with the tank outlet and an outlet communicating with the tank inlet for the passage of heated water through the heat exchanger. Also, a pump is coupled between the tank outlet and the heat exchanger inlet, the pump having a flow rate such that the drop in temperature of the water passing through the heat exchanger is less than 6° F. for the predetermined maximum temperature and the predetermined air flow rate.

According to another aspect of the invention, there is provided a method of providing potable hot water and space heating for a building using a hot water tank and a heat source for heating water in the tank. The method comprises the steps of heating water in the tank to a temperature between 150° F. and 200° F. The heated water is drawn out of the tank for potable hot water use and replenished with cold water. A portion of the heated water is circulated through a heat exchanger. Ambient air is passed through the heat exchanger to heat the air space. The temperature drop of the water passing through the heat exchanger is limited to a maximum of 6° F.

According to yet another aspect of the invention there is provided a heat exchanger for a combination hot water and space heater. The heat exchanger comprises a plurality of equi-spaced tubes arranged in two parallel rows. An inlet header is provided for each row of tubes, each inlet header communicating with one end of the tubes in its respective row. An outlet header is provided for each row of tubes, each outlet header communicating with an opposite end of the tubes in its respective row. An inlet manifold is connected to the inlet headers and an outlet manifold is connected to the outlet headers. Also, a plurality of equi-spaced, transverse, stacked fins surround the tubes.

DESCRIPTION OF THE PREFERRED EMBODIMENTS

Preferred embodiments of the invention will now be described, by way of example, with reference to the accompanying drawings, in which.

DETAILED DESCRIPTION OF THE PREFERRED EMBODIMENT

Figure 1:
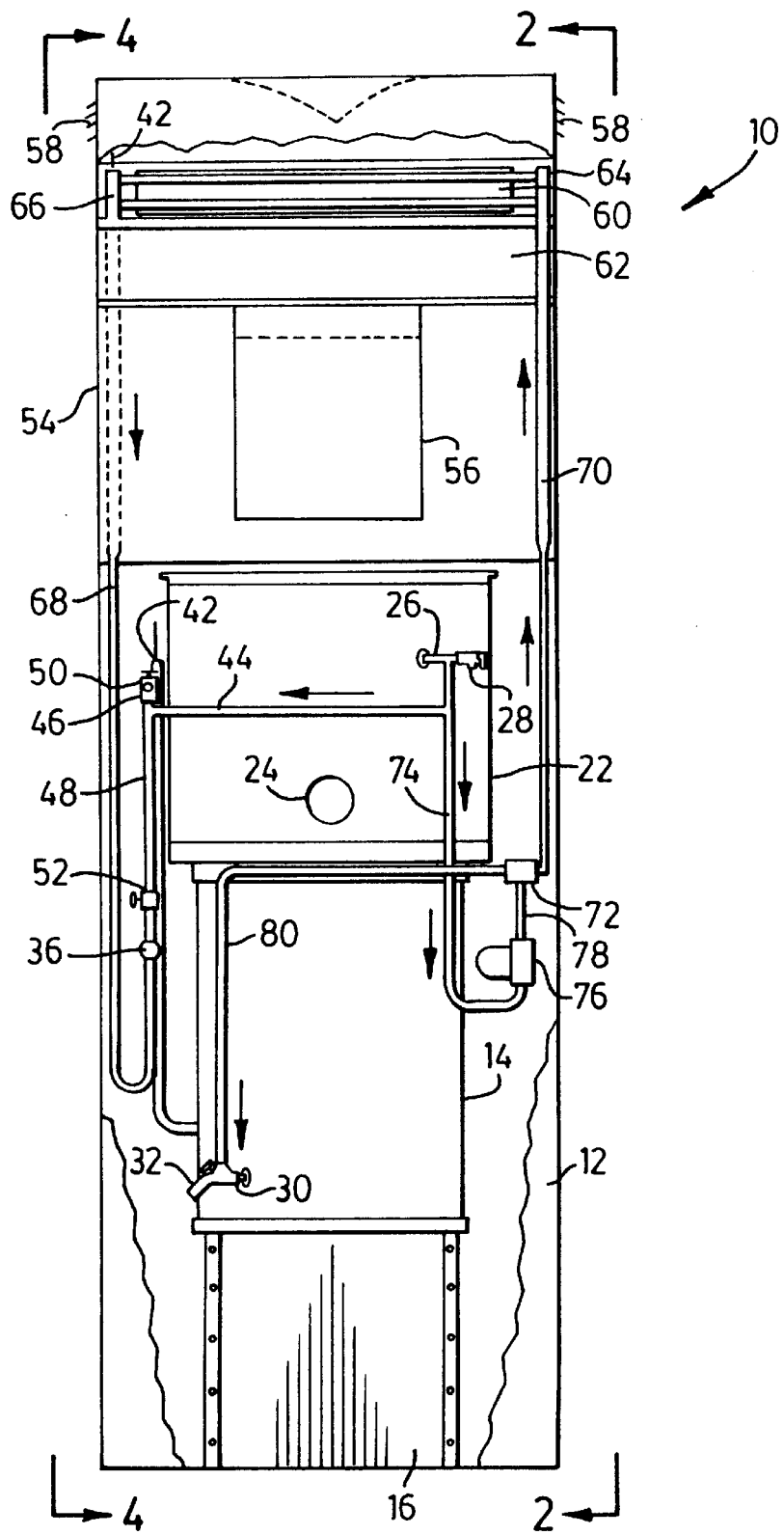
FIG. 1 is a front elevational view, partly broken away, showing a preferred embodiment of a combination hot water and space heater according to the present invention.

Referring to the drawings, a preferred embodiment of a combination hot water and space heater, hereinafter referred to as the "heater", is generally indicated by reference numeral 10. Heater 10 includes a housing or cabinet 12 with suitable removable panels or access doors (not shown) for gaining access to the components inside cabinet 12, as is common in the heating, ventilating and air conditioning industry. A hot water tank 14 is located inside cabinet 12 mounted on top of a fire box 16 forming a combustion chamber 18 for heating water in tank 14. An energy source 20 (see FIG. 2) is provided for producing the heat necessary to heat the water inside tank 14. Energy source 20 could be an oil burner, a natural gas or propane burner, or even an electrical heating element. In the latter case, fire box 16, of course, would not form a combustion chamber, but merely would be a space for mounting the heating element. Where an actual burner is used as the heat energy source, a chimney or flue passes up through the centre of water tank 14 and enters a breech or cap 22 ultimately to exit through a flue 24 and be vented to the exterior of the building.

The water tank and burner is what is referred to in the art as a dry base water heater. However, a wet base water heater could also be used wherein the combustion chamber is right inside the water tank and surrounded by water. As an alternative, rather than using breech 22, which forms what is referred to as a revertible flue in the art, flue 24 could simply exit out of the top of water tank 14 and be directed to the exterior of cabinet 12 in any convenient manner.

As seen best in FIG. 1, water tank 14 has an outlet 26 for the outflow or delivery of heated potable water therefrom. A pressure and temperature relief valve 28 is provided as a safety device in case the water inside tank 14 exceeds the tank's pressure and temperature design limits. Tank 14 also has a drain 30 with an appropriate tap or valve 32. Drain 30 also acts as a recirculation inlet, as will be described further below.

Figure 4:
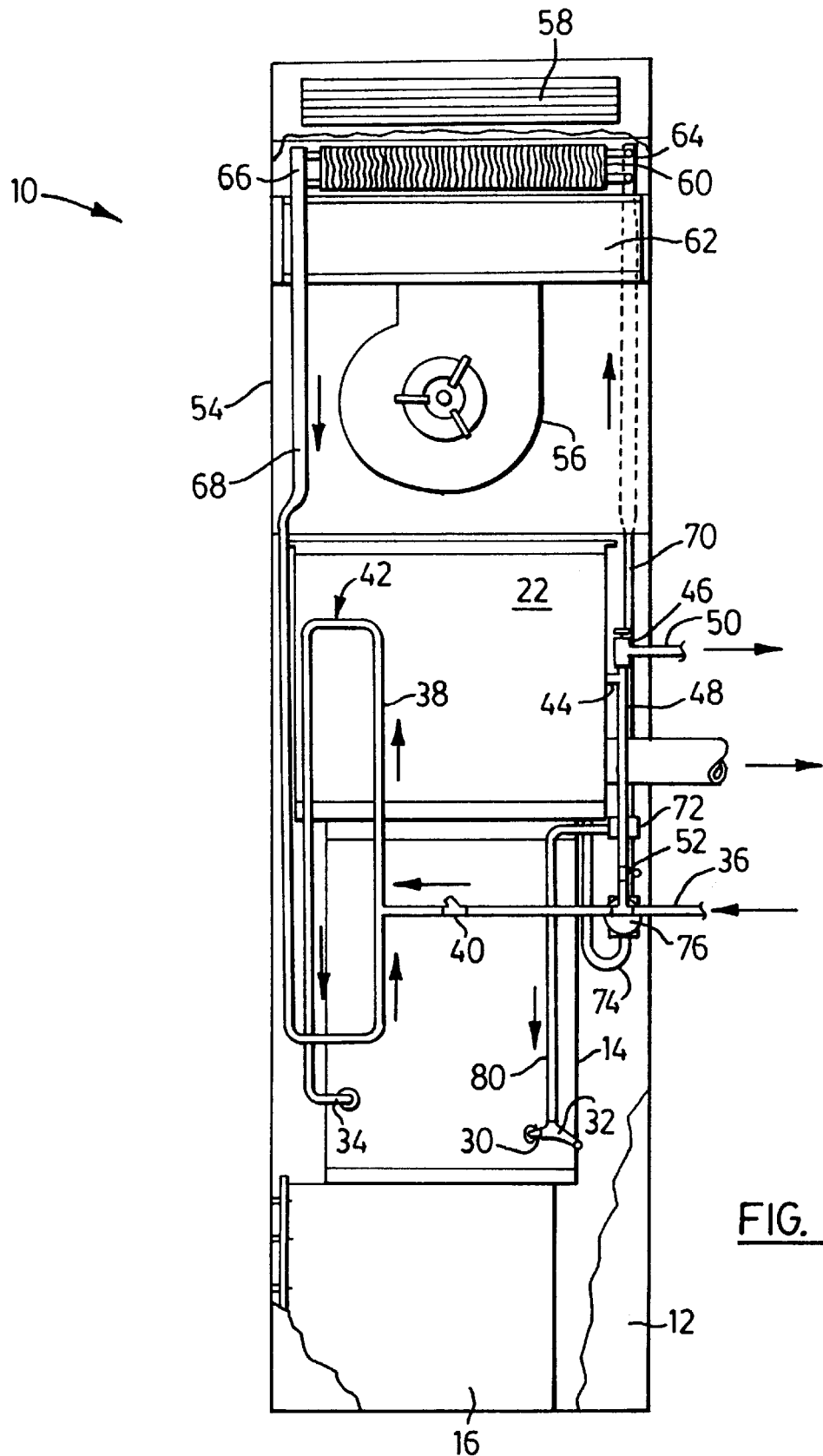
FIG. 4 is a left side elevational view, partly broken away, of the embodiment shown in FIGS. 1 to 3 taken along lines 4—4 of FIGS. 1 and 3.
Figure 5:
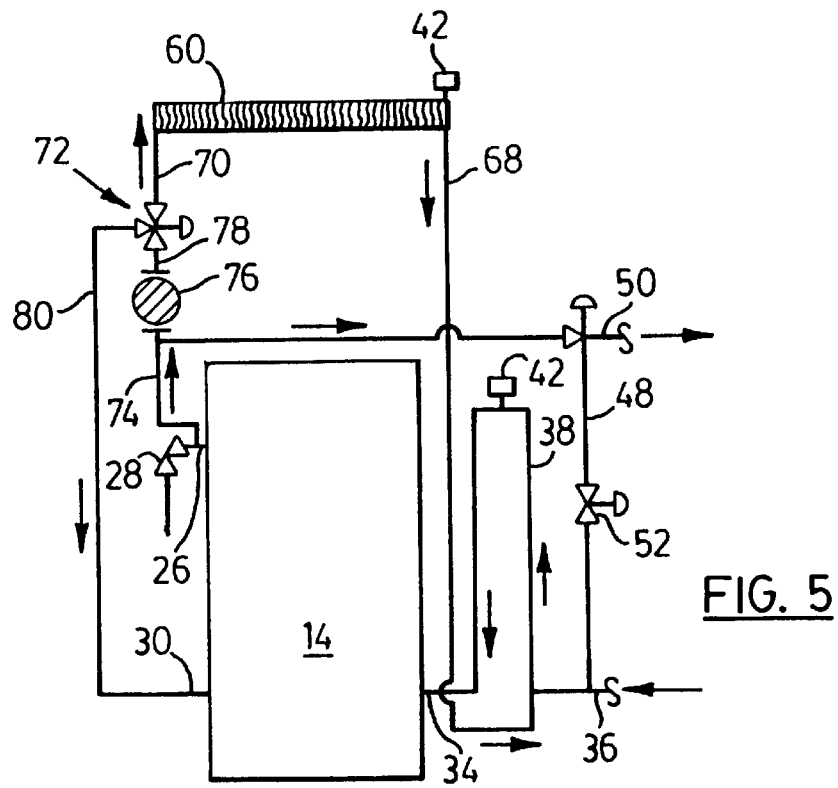
FIG. 5 is a schematic flow circuit diagram for the embodiment shown in FIGS. 1 to 4.

Referring next to FIG. 4, water tank 12 also has an inlet 34 for receiving a supply of cold, make-up water into the tank, as the hot water is drawn off through outlet 26. A cold water or make-up water inlet line 36 communicates with tank inlet 34 through an anti-convection trap or conduit 38 which is in the form of an inverted U-shaped tube. This prevents hot water from flowing backwards by convection from tank inlet 34 back to cold water inlet 36. A check valve 40 is also provided to prevent back flow into cold water inlet line 36. Trap 38 also has a bleed valve 42 for bleeding off any accumulated air therein.

Figure 2:
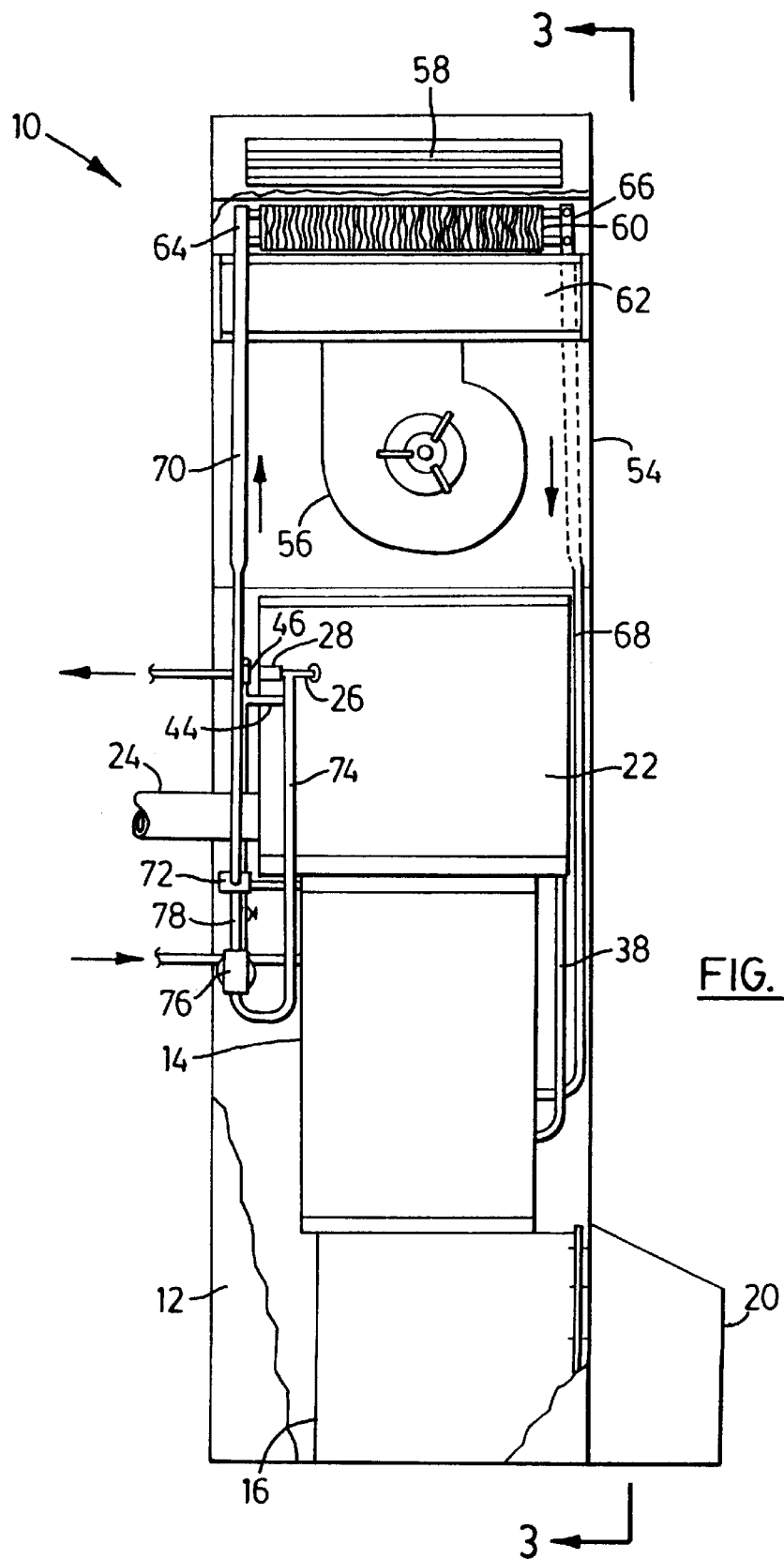
FIG. 2 is a right side view, partly broken away, of the embodiment shown in FIG. 1 taken along lines 2—2 of FIG. 1.
Figure 3:
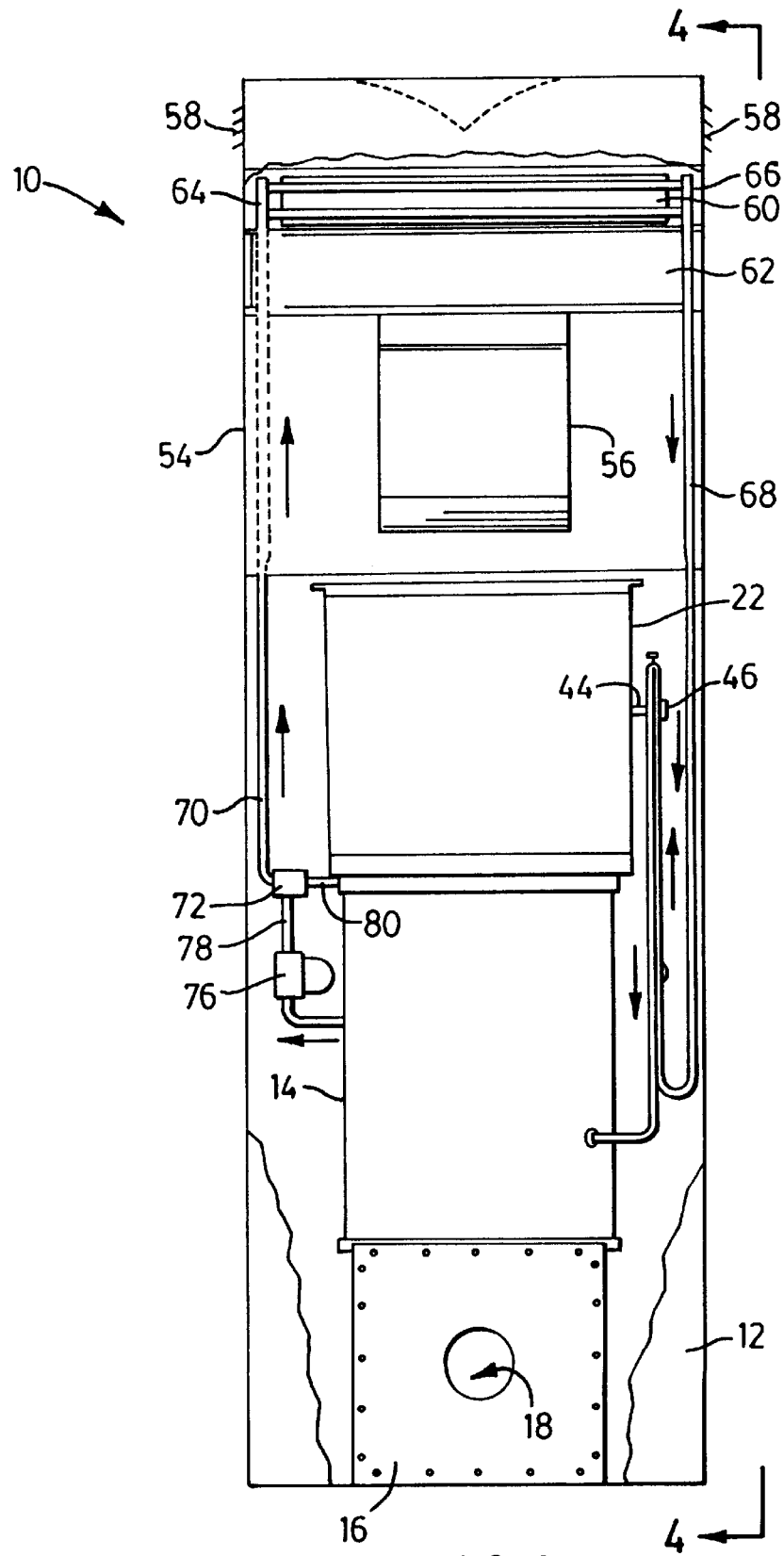
FIG. 3 is a rear elevational view, partly broken away, of the embodiment shown in FIGS. 1 and 2 taken along lines 3—3 of FIG. 2.

As seen best in FIGS. 1 and 2, tank outlet 26 leads to a cross-conduit 44, which in turns leads to a mixing valve 46.

As seen best in FIG. 4, a cold water by-pass line 48 is connected between cold water inlet line 36 and mixing valve 46 to provide cold water to mixing valve 46. Mixing valve 46 mixes this cold water in with the hot water coming from cross-conduit 44 to control the temperature of the potable or domestic water coming from water tank 14. Mixing valve 46 is connected to a potable hot water outlet line 50 and mixing valve 46 keeps the water emerging from this outlet line at a predetermined maximum temperature, typically about 120 degrees F. Mixing valve 46 may also be referred to as a tempering valve or an anti-scald valve. A balancing valve 52 is also provided in cold water bypass line 48 to balance the flow in the system.

The upper part of cabinet 12 forms an air handler housing 54 containing a fan or blower 56 in the form of a direct drive squirrel-cage blower capable of delivering about 1100 CFM of air flow. Housing 54 has an air inlet (not shown) which could be in any one of the walls of the portion of the housing containing blower 56. Housing 54 also has one or more top air outlets 58. A heat exchanger 60 is located in the housing between the inlet and the outlet for the flow of air therethrough. Heat exchanger 60 will be described in more detail below. A pressure equalizing chamber 62 is located between blower 56 and heat exchanger 60 to help even out the air flow through the heat exchanger.

Heat exchanger 60 has a water inlet manifold 64 and a water outlet manifold 66. As seen best in FIG. 4, water outlet manifold 66 is connected to a return line 68 which leads to anti-convection trap 38. The outlet of heat exchanger 60 is in communication with the tank inlet 34 through anti-convection trap 38. 1

As seen best in FIG. 1, heat exchanger inlet manifold 64 is connected to a supply line 70, which in turn is connected to a three-way valve 72. A recirculation line 74 is connected between tank outlet 26 and a pump 76, and an outlet line 78 from pump 76 is also connected to three-way valve 72. A by-pass line 80 is also connected to three-way valve 72 and leads to drain 30, and since valve 32 is normally closed water flowing through by-pass line 80 flows in reverse through drain 30 back into tank 14. The operation of three-way valve 72 will be described further below.

Pump 76 is an impeller pump which typically delivers about 10 to 12 U.S. gallons per minute.

Figure 6:
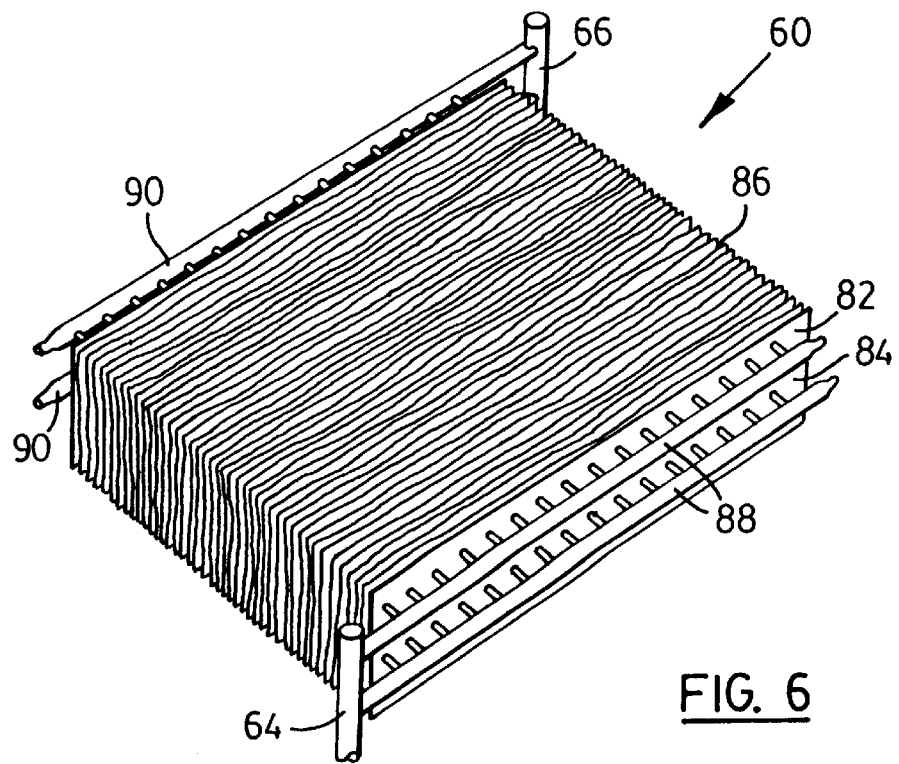
FIG. 6 is a perspective view of the heat exchanger used in the combination hot water and space heater shown in FIGS. 1 to 4.

Referring next to FIG. 6, heat exchanger 60 is of the tube and fin type having two rows of equi-spaced tubes 82, 84. The tubes are at a pitch of about 1.5 inches and rows 82, 84 are spaced apart about 1 inch. Fins 86 are located transversely and surround the tubes and are spaced apart at a pitch of about 10 fins per inch. Heat exchanger 60 is approximately 18 inches by 24 inches and 3 inches thick.

Each row of tubes 82, 84 has an inlet header 88, each inlet header communicating with one end of the tubes in its respective row. An outlet header 90 is provided for each row of tubes, each outlet header communicating with an opposite end of the tubes in its respective row. Inlet manifold 64 is connected to inlet headers 88 and outlet manifold 66 is connected to outlet headers 90. The remote ends of headers 88 and 90 are pinched off or closed, so that flow goes from inlet manifold 64, through headers 88, through the tubes to headers 90 and out through outlet manifold 66. Thus, heat exchanger 60 is a single pass tube and fin heat exchanger. The tubes, headers and manifolds are typically formed of copper tubing and the fins are formed of aluminum. The tubes are typically ½ inch diameter, the headers ¾ inch diameter and the manifold 1 inch diameter.

The operation of heater 10 will now be described. The capacity of tank 14 is typically 32 U.S. gallons and it is heated by a burner or electric heating element to heat the water therein to a temperature typically between 155 and 170° F. The water could go as high as 200° F. in some cases, but this would probably require the use of a wet base water heater, preferably made of stainless steel. Pump 76 runs continuously. If there is no demand for air heating, three-way valve 72 causes the output of pump 76 to be recirculated back through by-pass line 80, and no water goes through heat exchanger 60. This continual movement or recirculation of water scrubs the bottom of tank 14 and prevents sedimentation. If there is a demand for air heating, three-way valve 72 diverts the output of pump 76 up through heat exchanger 60. Blower 56 is then activated and the air passing through air handler housing 54 is heated to a temperature of between 115 and 125° F. If the temperature of the air exiting through air outlets 58 drops below 115 degrees, three-way valve 72 is activated to stop or suspend temporarily the water flow through the heat exchanger and divert it back to the water tank through by-pass line 80. Blower 56 is also shut off. Similarly, if the temperature of the air flow coming out of heater 10 rises above 125 degrees, by-pass valve 72 is activated to stop water flow through heat exchanger 60 and divert it back to tank 14 through by-pass line 80. In this latter case, blower 56 does not shut off unless a room air thermostat (not shown) connected to heater 10 sends a signal saying further heating is not required. It will be noted that the by-pass flow entering tank 14 through drain 30 does so at a location remote from tank inlet 34. This also helps to prevent heating of heat exchanger 60 by convection when air heating is not desired.

In the summer, when no air heating is required, three-way valve 72 would permanently divert the output of pump 76 back to the water tank through by-pass line 80. Pump 76 keeps on running even in the summer, however, to give the continuous scrubbing action and prevent sedimentation, as mentioned above.

With a flow rate through pump 76 of between 10 and 12 U.S. gallons per minute and using a single pass heat exchanger 60, the temperature drop of the water passing through heat exchanger 60 is a maximum of about 6° F. when the water temperature supplied to heat exchanger 60 is about 170° F. At the lower limit of water temperature being supplied to heat exchanger 60, namely at around 150 to 155° F., the temperature drop across heat exchanger 60 is only about 1 or 2° F. If it is desired to maintain the water temperature in tank 14 at a higher temperature than 170 degrees, the temperature drop across heat exchanger 60 can still be maintained at a maximum of about 6° F. by increasing the pump size or flow rate through the heat exchanger. Alternatively, the tubes in heat exchanger 60 could be increased in size or reconfigured to reduce the internal flow resistance therein, or other changes to the heat exchanger could be made to maintain the maximum temperature drop across the heat exchanger of about 6° F.

Having described preferred embodiments of the invention, it will be appreciated that various modifications may be made to the structures described above. For example, the air handler portion of heater 10 could be separated from the water heater and placed in a remote location. Other types of heat exchangers could be used, and as mentioned above, other types of water heaters could be used as well. The sizes of the various components mentioned above are suitable for producing a unit with an air heating capacity of about 65,000 BTU per hour with a burner input energy of about 110,000 BTU per hour. It will be appreciated by those skilled in the art that other capacities, air flow rates, etc. could be achieved with suitable modifications.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A combination hot water and space heater comprising: a tank having an inlet for receiving cold water and an outlet for delivering hot water therefrom; an energy source for heating water in the tank to a predetermined maximum temperature; a housing mounted on top of the tank having an air inlet and an air outlet; a fan for passing air through the housing from said inlet to said outlet at a predetermined flow rate; a heat exchanger located in the housing, the heat exchanger having an inlet and an outlet, the heat exchanger inlet communicating with the tank outlet; an anti-convection conduit trap connecting the heat exchanger outlet to the tank inlet for the passage of heated water through the heat exchanger; and a pump coupled between the tank outlet and the beat exchanger inlet, the pump having a predetermined flow rate and the heat exchanger having a configuration such that the drop in temperature of the water passing through the heat exchanger is less than 6° F. for said predetermined maximum temperature and predetermined air flow rate.

2. A combination hot water and space heater as claimed in claim 1 and further comprising a cold water inlet line, said inlet line including said anti-convention trap.

3. A combination hot water and space heater as claimed in claim 1 and further comprising a cold water inlet line connected to the anti-convection conduit for adding make-up water to the tank.

4. A combination hot water and space heater as claimed in claim 2 wherein the cold water inlet line includes a check valve for preventing the back flow of cold water.

* * * * *